May 5, 1953  E. R. PRICE  2,637,216
TRANSMISSION OPERATING MECHANISM
Filed Nov. 30, 1950  2 SHEETS—SHEET 1

INVENTOR.
EARL R. PRICE
BY H. O. Clayton
ATTORNEY

May 5, 1953 E. R. PRICE 2,637,216
TRANSMISSION OPERATING MECHANISM
Filed Nov. 30, 1950 2 SHEETS—SHEET 2
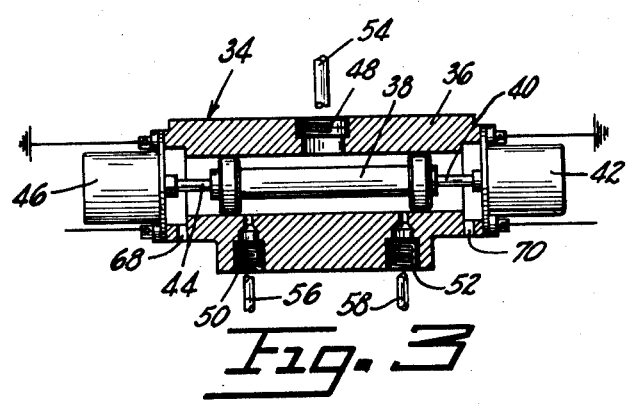
Fig. 3
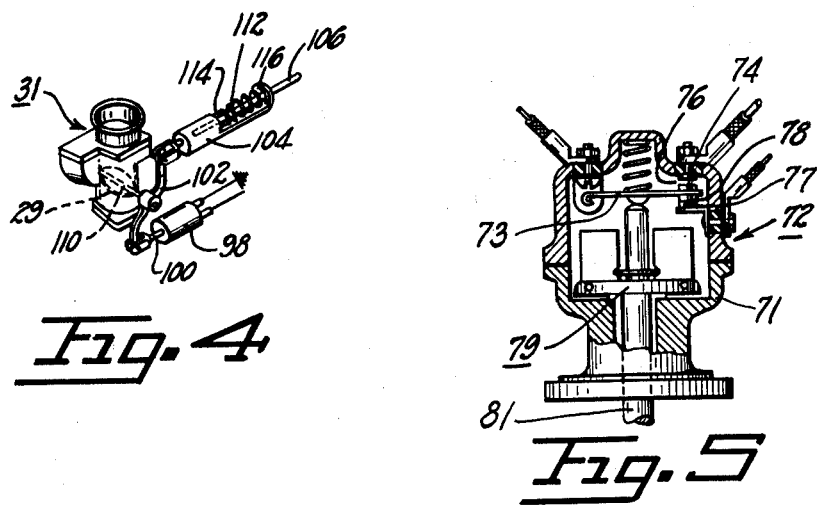
Fig. 4
Fig. 5
INVENTOR.
EARL R. PRICE
BY H. O. Clayton
ATTORNEY Patented May 5, 1953

2,637,216

UNITED STATES PATENT OFFICE 2,637,216

TRANSMISSION OPERATING MECHANISM

Earl R. Price, South Bend, Ind., assignor to Bendix Aviation Corporation, South Bend, Ind., a corporation of Delaware Application November 30, 1950, Serial No. 198,335

3 Claims. (Cl. 74—472)

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for an automotive vehicle change speed transmission mechanism, said mechanism being electrically selective under the control of engine speed responsive means and engine torque controlling means.

Yet another object of my invention is to provide power means for actuating a two-speed axle mechanism of an automotive vehicle, said power means being automatically operative, to shuttle the mechanism between its two settings, with a normal operation of the internal combustion engine of the vehicle. With the mechanism of my invention an upshift operation of the transmission is automatically effected when the speed of the engine reaches a certain factor; and should the driver desire to effect a low gear setting of the transmission, say to facilitate the passing of a car on the road, he need but depress the accelerator to its wide open throttle position, whereby the mechanism of my invention will operate to establish the transmission in said setting; and with the mechanism of my invention in a low gear setting of the transmission the same is automatically established when the speed of the engine is decreased to a certain factor.

Yet another object of my invention is to provide a mechanism for operating a change speed transmission of an automotive vehicle and an engine speed responsive governor said control means being such that a manipulation of the accelerator to control the speed of the engine coupled with the operation of the governor, effects an operation of the motor to shuttle the transmission between two of its settings.

A further object of the invention is to provide a compact, easily serviced and relatively simple double acting unit adapted for use in mechanism for operating the shiftable elements of the two-speed axle structure of an automotive vehicle.

The above and other objects and features of the invention will appear more fully hereinafter from a consideration of the following description taken in connection with the accompanying drawings, wherein one embodiment of the invention is illustrated by way of example.

Figure 3 is a sectional view disclosing details of the valve mechanism of my invention;

Figure 4 is a view disclosing the throttle closure mechanism of my invention; and Figure 5 is a view disclosing the details of the governor operated switch of my invention.

The transmission operating power means constituting my invention is preferably employed to operate a two-spaced axle transmission mechanism of an automotive vehicle; however, it may be employed to operate any power transmitting mechanism of the power plant of a land or marine vehicle wherein said mechanism is selectively movable to two operative positions.

Figure 1:
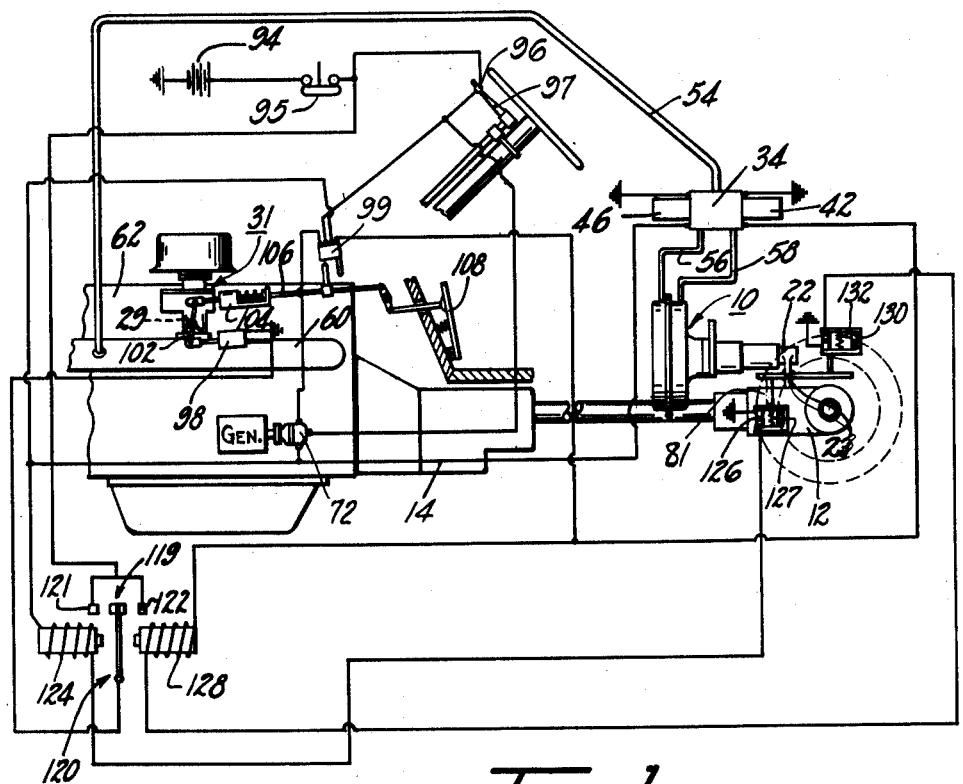
Figure 1 is a diagrammatic view of an automotive vehicle embodying the transmission operating mechanism of my invention.

Referring to Figure 1, a transmission operating power unit 10, preferably of the vacuum suspended type, is detachably mounted on the carrier of what is known in the automotive art as a two-speed axle, that is, a part of the driving mechanism of the vehicle effecting a gear ratio in addition to the usual driving ratio and different therefrom. This two-speed axle mechanism, actuated by the shifter mechanism of my invention, is indicated by the reference numeral 12, and a change speed transmission mechanism cooperating therewith is indicated by the reference numeral 14. The transmission operating mechanism constituting my invention may be employed to operate a Maybach clutch type of two-speed axle, however, any other well known two-speed axle construction is equally well operated by the mechanism of my invention.

Figure 2:
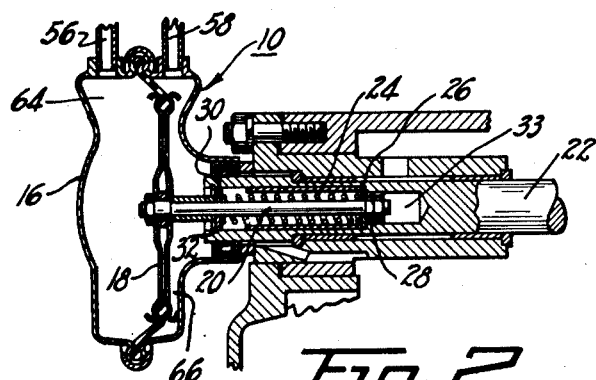
Figure 2 is a view disclosing the transmission operating vacuum motor of the invention.

There is disclosed in Figure 2 a preferred embodiment of the vacuum suspended power unit 10 of the transmission operating mechanism of my invention, said unit including a two-part casing 16 housing a power element 18 which is secured to a stem 20. This stem is sleeved within a hollow rod 22 which is connected at its outer end to a shifting fork 23 of the two-speed axle mechanism 12. A preloaded spring 24, housed within the rod 22 and sleeved over the stem 20, abuts at one of its ends a stop washer 26 which is in abutment with a projection 28 constituting a part of the rod 22; and the other end of the spring 24 abuts a stop washer 30 which is sleeved over the stem 20 and which is in abutment with a stop ring 32 secured to the other end of the hollow rod 22.

When the motor 10 is energized to move the piston 18 to the right, Figure 2, the stem 20 is moved within a recess 33 in the rod 22 and with it the washer 28 on the end thereof; and in this operation the spring 24 is further compressed. Then when the torque of the engine is reversed, preferably as a result of a closing of the throttle 29 of the carburetor 31, Figure 1, the rod 22 will move to the right, Figure 2, under the load of the then compressed spring 24 to demesh the transmission; and after the two gears to be meshed are synchronized, the spring 24 continues its expansion to effect a high gear setting of the transmission.

Describing the low gear operation of the motor 10 when said motor is again energized the diaphragm 18 moves to the left, Figure 2, the end of the stem 20 moving within the recess 33. In this operation the spring 24 is further compressed inasmuch as the distance between the washers 26 and 30 is shortened, the washer 30 remaining stationary. Then as described above when the engine torque is reversed the rod 20 and associated parts move as a unit to the left to demesh the transmission; and lastly after the synchronization of the gears has been effected the spring 24 expands to effect a low gear setting of the transmission.

A solenoid operated doubled three-way valve 34 is provided to control the operation of the motor 10. This valve, no claim to which is made, includes a casing 36 ported at 48 to receive a conduit 54 leading to the intake manifold 60 of the engine. The casing is also ported at 50 to receive a conduit 56 leading to a compartment 64 of the motor 10; and the casing is ported at 52 to receive a conduit 58 leading to a compartment 66 of said motor. A spool shaped valve piston 38, reciprocable within the casing 36, is secured to the armature, not shown, of a grounded solenoid 42 mounted on one end of the casing; and said valve piston is also secured at its other end, to the armature, not shown, of a grounded solenoid 46 also mounted on the casing. When the solenoid 42 is energized the valve piston 38 is moved to the right, Figure 3, to vent the valve port 50 to the atmosphere via the port 68 and thereby dump air into a motor compartment 64; and when the solenoid 46 is energized the valve piston 38 is moved to the left, Figure 3, to vent the valve port 52 to the atmosphere via the port 70 and thereby dump air into a compartment 66 of the motor 10. The piston 38 is shown in its neutral that is off position in Figure 3, the springs within the solenoids 42 and 46 serving to move said piston to this position; and in this position of the valve both compartments 64 and 66 of the motor are connected to the source of vacuum. It is for this reason that the motor is known as being of the vacuum suspended type.

There is thus provided a solenoid operated double three-way valve to control the operation of the double acting transmission operating motor the power element of the latter being moved to the left or right as a result of its being subjected to a differential of pressures.

The electrical means for controlling the operation of the solenoids 42 and 46 constitutes an important feature of my invention and includes, in series with the grounded solenoid 42, a grounded battery 94, the ignition switch 95 of the vehicle, a normally closed breaker switch 96 preferably mounted on the transmission shift lever 97, an engine governor operated switch 76, Figure 5, which is made when the engine of the vehicle is operating at or above a certain speed, say 2,000 R. P. M., and to a normally open kick-down breaker switch 99 operated by the accelerator 108 of the vehicle said switch being closed when the accelerator is depressed past its wide open throttle position. The shift lever operated switch 96 may be opened at will by the driver of the vehicle, said operation de-energizing the motor 10 thereby facilitating a manual operation of the transmission. The grounded solenoid 46 is electrically connected in series with the aforementioned battery 94, the ignition switch 95, the shift lever operated switch 96, and with an engine governor operated switch 78, Figure 5.

The engine governor operated means for operating the switches 76 and 78 is disclosed in detail in Figure 5 and includes a casing 71 having a governor actuated movable contact 73 and two fixed contacts 74 and 77. The entire governor mechanism is indicated by the reference numeral 72. The centrifugal governor portion of the mechanism, indicated by the reference numeral 79, is actuated by a shaft 81 drivably connected to the internal combustion engine of the vehicle the speed of the shaft being directly proportional to the speed of the engine. At or below a certain relatively low engine speed, say 1,500 R. P. M., the switch mechanism 72 is operative to close the switch 78 to effect a low gear operation of the mechanism of my invention; and when the engine speed is increased to 2,000 R. P. M. the switch 76 is closed to effect a high gear operation thereof. The normally open kick-down breaker switch 99, electrically connected in parallel with the switch 78, is closed when the accelerator is depressed past its wide open throttle position.

Another feature of my invention lies in electrical means for closing the throttle valve 29 of the carburetor 31 of the vehicle when either the accelerator is operated to effect a kick-down operation, that is, low gear operation of the transmission mechanism, or the engine operated governor 72 is operative to effect either a low or high gear operation of the transmission. This throttle closing electrical means includes a grounded solenoid 98 having its armature, not shown, connected to the lower arm of a two-armed throttle operating crank 102. The upper arm of said crank is preferably pivotally connected to a lost motion connection. This connection, no claim to which is made, includes a body member 104 bored to slidably receive one end of a rod 106 which is connected to the accelerator 108 of the vehicle by the linkage disclosed in Figure 1. The rod 106 extends through a flanged end 116 of an extension extending from one end of the member 104. A spring 112 is interposed between one face of the flange 116 and a thrust member 114 secured to the rod 106; and said spring is sleeved over said rod. When the solenoid 98 is energized to close the throttle valve the throttle opening movement of the accelerator has no effect on said valve inasmuch as this operation merely serves to compress the spring 112.

Continuing the description of the throttle closing electrical means the grounded solenoid 98 is electrically connected in series with the grounded battery 94 and a normally open switch 118 of a throttle closing relay 120. A coil 124 of the relay is electrically connected in series with the kick-down switch 99 and with a normally closed breaker switch 126. The latter switch, which is grounded, is biased to its closed position by the operation of a transmission operated finger member 81 which serves to further compress a spring 127. When the transmission 12 is established in its low gear setting the finger 81 clears the switch housing thereby permitting the spring 167 to expand to open the switch. A coil 128 of the relay 120 is electrically connected in series with the kick-down switch 99 and with a grounded breaker switch 130. As with the switch 126 the switch 130 is normally made, however the same is broken by the operation of a spring 132 when the transmission 12 is established in its high gear setting.

Describing now the complete operation of the mechanism of my invention it will be assumed that to get the car under way the driver places the three-speeds forward and reverse transmission 14 in its low gear setting. At this time the vehicle is at a standstill, accordingly, the governor operated switch 78 is made resulting in an establishment of the two-speed axle 12 in its low gear setting. The driver will then re-engage the friction clutch, assuming that the vehicle includes this conventional mechanism, and at the same time depress the accelerator to speed up the engine. After the vehicle is under way the driver will establish the transmission 14 in the setting desired, probably its high gear setting.

As to the operation of the two-speed axle transmission 12 when the speed of the engine is increased to the critical factor, which in the present instance is 2,000 R. P. M., the governor 72 is automatically operative to close the switch 74 whereupon the valve 38, Figure 3, is rendered operative to control the motor 10 to establish the transmission in its high gear setting. In effecting this operation it is to be remembered that in this operation the relay 129 and switch 130 are operative to momentarily close the throttle. The transmission 12 then remains in its high gear setting until either the accelerator is sufficiently depressed to close the kick-down switch 99 or the engine speed is dropped below the aforementioned factor of 1,500 R. P. M. whereby the governor operated switch 76 is opened and the governor operated switch 78 is closed; and this operation effects, through the intermediary of the operation of the valve 34, an operation of the motor 10 to establish the transmission 12 in its low gear setting. In this operation, as with the aforementioned high gear operation of the mechanism, the throttle is momentarily closed to facilitate the operation of the shifter mechanism.

There is thus provided a simple, compact and effective mechanism for operating the two-speed axle of an automotive vehicle; for depending upon the speed of the engine the axle mechanism 12 is shuttled between its two settings the throttle being automatically closed to facilitate said operations. Should the driver elect to overrule the switch 76 and place the axle 12 in its low gear setting when the engine is operating at a relatively high speed he need but open the switch 96 and then manually operate the shift lever to establish the transmission in low; or he may effect this setting of the transmission by depressing the accelerator beyond its wide open throttle position. Incidentally the latter operation is the natural one of the driver when it is desired to pass the car on the road.

I claim:

1. In an automotive vehicle provided with a change speed transmission, internal combustion engine, and a carburetor including a throttle valve; power means for operating the transmission including a double acting pressure differential operated motor, valve means for controlling the operation of the motor including a double three-way valve, and electrical means for controlling the operation of the valve means including two solenoids for operating the three-way valve, a governor operated switch mechanism electrically connected to the solenoids and comprising a governor operated by the engine, means providing two switches; together with means, including a relay mechanism, cooperating with the aforementioned electrical means and operative to effect a momentary closure of the throttle valve to facilitate an operation of the transmission operating mechanism, said means further including a solenoid for closing the throttle.

2. In an automotive vehicle provided with an accelerator, a two speed axle mechanism, an internal combustion engine, and a carburetor having a throttle valve; power means for operating the transmission including a double acting pressure differential operated motor operably connected to the transmission, valve means for controlling the operation of the motor, and means, including two separate solenoids, for controlling the operation of the valve means, said control means further including a governor operated switch mechanism including two switches, drive means interconnecting the engine and the governor portion of the governor operated switch mechanism, electrical means interconnecting one of the solenoids with one of the switches of the governor switch mechanism, said electrical means including a normally closed breaker switch adapted to be operated by the accelerator, electrical means interconnecting the other of the two solenoids with the other of the two governor operated breaker switches and including an accelerator operated breaker switch electrically connected in parallel with the latter governor operated switch.

3. In an automotive vehicle provided with an accelerator, a two speed axle mechanism, an internal combustion engine, and a carburetor having a throttle valve; power means for operating the transmission including a double acting pressure differential operated motor operably connected to the transmission, valve means for controlling the operation of the motor, and means, including two separate solenoids, for controlling the operation of the valve means, said control means further including a governor operated switch mechanism including two switches, drive means interconnecting the engine and the governor portion of the governor operated switch mechanism, electrical means interconnecting one of the solenoids with one of the switches of the governor switch mechanism, said electrical means including a normally closed breaker switch adapted to be operated by the accelerator, electrical means interconnecting the other of the two solenoids with the other of the two governor operated breaker switches electrically connected in parallel with the latter governor operated switch, together with means, including a solenoid for effecting a temporary closing of the throttle when the power means is operating to effect an operation of the transmission.

EARL R. PRICE.

References Cited in the file of this patent

UNITED STATES PATENTS

| Number | Name | Date |
|---|---|---|
| 1,911,599 | Bloxsom | May 30, 1933 |
| 1,979,488 | Perez | Nov. 6, 1934 |
| 2,062,104 | Prince | Nov. 24, 1936 |
| 2,104,608 | Cox et al. | Jan. 4, 1938 |
| 2,118,978 | Maybach | May 31, 1938 |
| 2,252,009 | Kenny | Aug. 12, 1941 |
| 2,266,598 | Hale | Dec. 16, 1941 |
| 2,380,677 | Schjolin | July 31, 1945 |
| 2,434,717 | Randol | Jan. 20, 1948 |
| 2,447,730 | Britton | Aug. 24, 1948 |
| 2,451,058 | Bennetch | Oct. 12, 1948 |
| 2,454,614 | Peterson et al. | Nov. 23, 1948 |
| 2,499,128 | Brunken | Feb. 28, 1950 |